United States Patent
Ravenet

(10) Patent No.: US 8,149,984 B2
(45) Date of Patent: Apr. 3, 2012

(54) FUEL ELEMENT OF THE MACROSTRUCTURED PLATE TYPE

(75) Inventor: Alain Ravenet, Vinon sur Verdon (FR)

(73) Assignee: Commissariat a l'Energie Atomique (FR)

( * ) Notice: Subject to any disclaimer, the term of this patent is extended or adjusted under 35 U.S.C. 154(b) by 1008 days.

(21) Appl. No.: 11/989,854

(22) PCT Filed: Aug. 8, 2006

(86) PCT No.: PCT/EP2006/065142
§ 371 (c)(1),
(2), (4) Date: Jan. 30, 2008

(87) PCT Pub. No.: WO2007/017503
PCT Pub. Date: Feb. 15, 2007

(65) Prior Publication Data
US 2009/0274262 A1   Nov. 5, 2009

(30) Foreign Application Priority Data
Aug. 10, 2005   (FR) ...................................... 05 52488

(51) Int. Cl.
*G21C 3/36* (2006.01)
*G21C 3/00* (2006.01)
*G21C 3/34* (2006.01)

(52) U.S. Cl. ........ 376/432; 376/409; 376/414; 376/416; 376/412; 376/438; 376/462

(58) Field of Classification Search ...................... 76/438, 76/432, 462, 414, 416, 412, 409; 376/438, 376/432, 462, 414, 416, 412, 409
See application file for complete search history.

(56) References Cited

U.S. PATENT DOCUMENTS

| | | | |
|---|---|---|---|
| 3,070,527 A | 12/1962 | Hurford et al. | |
| 3,071,526 A * | 1/1963 | Litt | ................................ 29/445 |
| 3,097,152 A | 7/1963 | Walker | |
| 3,311,541 A | 3/1967 | Eyre | |
| 3,586,745 A * | 6/1971 | Triggiani et al. | ............... 264/0.5 |
| 3,855,061 A | 12/1974 | Triggiani et al. | |
| 4,038,135 A | 7/1977 | Bergougnoux et al. | |
| 4,720,370 A * | 1/1988 | Travelli | .......................... 376/422 |
| 4,963,317 A | 10/1990 | Wiencek et al. | |
| 5,192,495 A * | 3/1993 | Caldwell et al. | .............. 376/417 |

(Continued)

FOREIGN PATENT DOCUMENTS
DE   10343942   4/2005
(Continued)

OTHER PUBLICATIONS

Wei et al., "Initial Requirements for Gas-Cooled Fast Reactor (GFR) System Design, Performance, and Safety Analysis Models", Generation IV Nuclear Energy Systems, Aug. 27, 2004, pp. 1-25.*

*Primary Examiner* — Rick Palabrica
*Assistant Examiner* — Erin M Leach
(74) *Attorney, Agent, or Firm* — Baker & Hostetler LLP

(57) ABSTRACT

A new nuclear fuel element has been developed to be used in particular in fourth generation gaseous heat exchanger reactors working with a fast neutron flow.
With a composite plate structure, the element (1) according to the invention comprises a network of cells (8), more preferably of honeycomb shape, in each of which is placed a nuclear fuel pellet (10). Radial and axial gaps are provided in each cell (8) to compensate for the differential expansion between fissile materials and structural materials inherent in the operation of the plate (1).

14 Claims, 2 Drawing Sheets

U.S. PATENT DOCUMENTS

| | | |
|---|---|---|
| 6,593,848 B1 | 7/2003 | Atkins |
| 2006/0044401 A1 | 3/2006 | Park |
| 2006/0077095 A1 | 4/2006 | Tucker |

FOREIGN PATENT DOCUMENTS

| | | |
|---|---|---|
| DE | 102004047865 | 4/2006 |
| EP | 1447783 | 8/2004 |
| FR | 2 398 367 | 2/1979 |
| JP | 08-339160 | 12/1996 |
| JP | 2004-258900 | 9/2004 |
| JP | 2005-316004 | 11/2005 |
| WO | 2005034136 | 4/2005 |
| WO | WO2006/016295 | 2/2006 |
| WO | WO2006/034571 | 4/2006 |

* cited by examiner

FUEL ELEMENT OF THE MACROSTRUCTURED PLATE TYPE

TECHNICAL FIELD

This invention is related to the field of fuel elements used in nuclear reactors and in particular to fuel plates developed for new designs of reactor termed fourth generation.

More particularly, the device according to the invention is designed for installations operating in the high temperature field, i.e. for High Temperature Reactors (HTR) in which the temperature of the coolant at the reactor output is above 800° C.; more preferably, these are gaseous heat exchanger reactors operating with a fast neutron flow cooled by a gas, or GFR (for "Gas Fast Reactor").

The invention proposes an element design suited to the operating conditions imposed and offering improved performance; it proposes more particularly a new design of macrostructured composite fuel "plate element" which meets the GFR specification.

PRIOR ART

Stations for the production of energy from fission reactions use fuel elements in which fissions releasing power in the form of heat occur, which is extracted from them by heat exchange with a heat conducting fluid providing their cooling.

To this end, while supporting the stresses which the behaviour of the fuel and its operating conditions impose, the general principles for designing basic fuel elements aim to satisfy the following functionalities:

- to have a density of fissile atoms compatible with the neutron operating conditions and with the power density per unit volume of the reactive volume,
- to provide heat transfer between the fuel material and the heat-conducting fluid,
- to confine the solid and gaseous fission products released by the fuel.

Of course, fission reactions within the fuel generate solid and gaseous fission products which cause an expansion of the structure of the material, a phenomenon activated by the heat, which also induces mechanisms for releasing fission gases outside the fuel material. Sheathing the fuel material can accommodate these distortions without loss of the element's integrity.

The density of the fissions within the fuel is correlated directly with the power density to be evacuated to the heat exchanger through the sheath. The thermal resistance between the source of heat and the heat exchanger must accordingly be minimal in order to control the maximum temperature of the fuel and the effects induced by this heat flow, in other words the gradient within the materials and the differential expansions between the fuel and the sheath.

The density of fissile material in the reactive volume itself depends principally on the form of the fuel elements: the form determines the capacity of the fissile material to be arranged in a given volume while aiming for a maximum filling rate, as well as giving the permeability necessary for the heat exchanger to guarantee evacuation of the power produced by the elements with an acceptable load loss.

In nuclear installations, conventionally, three families of basic fuel elements can be used: a plate-type element (any shape), a cylindrical-type element (most often of circular or annular cross-section) extending along its axis, and a spherical-type element, most often in the form of small particles (with a diameter of approximately one millimeter). Spherical particles can also be enclosed in an inert matrix to generate composite fuel elements, which can also occur in the three preceding forms of bullet, plate and compact. Each type of fuel element combines different solutions to the problems posed and represents a compromise according to its field of operation.

For example, in plates, the sheaths behave as shells with a high slendering ratio (ratio between the free length of the shell and its thickness). By its malleability, the sheathing material adapts its geometry to that of the central part of the fuel, which allows accommodation of differential distortions (inflation and expansion) relative to the fuel material, transversally and at a very low stress level. However, this plate structure has little capacity to accommodate distortions in the direction of the thickness, owing to the very low rigidity of the sheaths perpendicular to their plane, and this freedom allows the fuel to be distorted anisotropically, more preferably in this direction. This structure is also unstable when buckling if it is put in compression in its plane, overall or locally (on a hot point, for example), particularly if the core of the fuel is not connected, or is weakly connected, to the sheaths.

In view of these shortcomings, plate elements are in fact used only for cold fuels, i.e. in the temperature range where the fuel material does not release its gaseous products, and at moderate power density levels. Optimisation parameters apply in general, for an intended power density level, to the thickness of the plate and the quality of the fuel/sheath contact, to control of corrosion of the sheath and to the preservation of its ductility properties in operation. In fact, the principal methods of ruining plates are connected either to an imposed lack of ductility in distortion of the sheathing (damage by corrosion or hardening under irradiation), or to an increase in the thermal resistance between the fuel and the heat exchanger (resistive corroded area on the sheath, separation of the fuel and sheath with opening of a gap by local buckling of the sheath, for example) which causes heating of the fuel with releasing of fission gases and internal pressurising of the sheathing, leading to fracture by instability in distortion of the sheath.

Cylindrical elements comprise graphite/gas reactor cartridges, pressurised water reactor (REP) pencils or fast neutron reactor (RNR) needles, for example. In this case, there is a radial gap between the fuel in the form of pellets and the sheath enclosing them, a gap which can accommodate differential distortions between the fuel material and the sheath: this gap is capable, at a minimum, of compensating for differential expansions as the element builds up power and the share of the fuel expansion that it cannot absorb itself by creep and re-densifying over its internal cavities. Actually, the fuel material must operate at a temperature which allows it to activate its own mechanisms for accommodating its distortions; as consideration, it releases a part of its fission gases. A second expansion volume is arranged in the sheath, in the ends of the stacks of fuel pellets, in order to limit the pressure inside the element. Heat transfer between the fuel pellets and the heat exchanger is then effected radially through a thermal resistance consisting of the radial gap between the pellet and the sheath filled with gas and the thickness of the sheath. Control of this thermal resistance throughout the life of the element can guarantee compliance with the temperature limits acceptable in the fuel. In this element design, there is therefore a heat transfer through a calibrated gaseous seal and an expansion chamber arranged in the direction transverse to that of the heat transfer.

The principal optimisation parameters for these cylindrical elements are the initial radial gap between the fuel and the sheath, the type of fluid providing the thermal bond between the fuel and the sheath (gaseous seal or molten metal seal), the effective filling density of the fuel in the cross-section of the sheath (radial gap, porosity, presence of discontinuities, such as a central hole and/or lenticular voids at the ends of the pellet), the rigidity of the sheath (thickness), the behavioural laws (inflation and creep) of the materials of the sheath and of the fuel, and their mechanical properties (strength and ductility).

The presence of a gap between the fuel and the sheath, however, provides a variable thermal resistance in operation (changes to the gap and a decrease in conductivity owing to the presence of fission gases) which complicates control of the maximum temperature of the fuel with regard to not reaching the melting point of the fuel material in all operating situations. Second, operating as a "pressurised chamber" for this type of element involves the use of materials capable of ensuring the mechanical strength of the element without risk of catastrophic failure (instantaneous and/or delayed) under pressure; to this end, a circular cross-section, which has the best resistance to pressure, is most often adopted: in a situation of mechanical interaction between the fuel and the sheath, the former opposes a significant reinforcing rigidity by its circumferential traction and the circumferential pressure exercised by the sheath on the fuel activates its self-rearrangement mechanisms.

The choice of material for the sheath therefore appears critical in that it must have a resistance to breakage compatible with the intended operating temperatures, a ductility in plasticity and in thermal creep, and adequate strength (typically >20 MPa·$\sqrt{m}$); this choice (yield point instantaneously and in creep) and that for the fuel material (melting point) determine the limit operating conditions (temperatures and power density) for the fuel elements. The principal method of residual ruin associated with this type of element is actually the instantaneous mechanical interaction between the fuel and the sheath exceeding the distortion capability of the latter (case of the power rising to a level greater than the preceding operating mode or into an operating mode where the temperature of the fuel does not activate its mechanisms for auto-accommodating its distortions).

As regards spherical elements, different surrounding layers are deposited on a fissile core which must be centred; empty spaces are thus created, in the form of porosities, within the fissile core and in an intermediate buffer layer with very high porosity, which ensures initial continuity between the fissile core and the sheathing layers. The accommodation of the differential distortions between the fuel and the sheath, in other words the cladding layer, is effected by filling the gaps: in operation, the gradual densifying of the buffer releases a radial gap capable of preventing a strong mechanical interaction between the fissile core and the sheathing layers. Moreover, free volumes inside the sheathing retain the fission gases released by the fissile material: the spherical form of the sheath is accordingly well suited to resisting the internal pressure which builds up. The optimisation parameters for the elementary particles are fundamentally the choice of materials (type, structure, properties and laws of behaviour under neutron flow and in temperature) and the thickness of the different layers.

These fuel elements are used only for gas-cooled heat flow reactors operating at high temperature. Their principal mode of residual ruin corresponds to the strong interaction between the fissile core and the sheathing layers (put into traction by the distortion imposed by the sheath) which can cause breakage of the confinement sheath: from this point of view, the spherical form of the sheathing, although ideal as regards the mechanical interaction, is the least favourable because it does not leave any direction of distortion for the fuel material (beyond its maximum densification) to relax the interaction forces (put under hydrostatic pressure by the internal volume of the sheath).

This spherical type of fuel element is actually used principally as part of composite elements of various shapes diluting the particles in a matrix ensuring heat transfer to the heat exchanger, with a low volumic fraction (a few %) of the fissile material in the reactive volume.

Composite elements were developed principally to reduce the risk of pollution of the primary heat exchanger circuit if the fuel elements fracture, so as to reduce as far as possible the amount of fission products capable of being released following an event initiating a break. In particular, elements in the form of macro-structured plates can be considered as one solution, with an ordered arrangement of the fuel particles and/or the quest for a particle density compatible with the volumic fraction of the intended application. In any case, to obtain good and uniform conductivity across the plate, a fuel dilution matrix and sheathing plates in a metallic material are used for the intended applications.

It appears that GFRs, including the heat exchanger gas, helium for example, can reach in the output of the reactor a sufficiently high temperature compatible with the intended high yield electricity production applications (for example in direct cycle) or hydrogen production and must operate with a fast flow providing a possibility of achieving a conversion rate greater than 1 (over-generation) and/or an ability to transmute the waste (fission products and minor actinides): an adaptation of the safety and reliability levels in operation to these requirements relative to those already achieved in previous generation systems is accordingly desirable.

The problem to be solved in order to have a fuel element compatible with the GFR specification has four components:
 1) to provide a high volumic fraction of fuel in the matrix,
 2) to guarantee the mechanical strength of each cell against the internal pressure of the fission gases released by the fuel,
 3) to avoid strong interactions between the fuel (by its expansion) and the structures of the cell,
 4) to evacuate the power produced to the heat exchanger with good conductivity across the plate in order to control temperatures at the core of the plate and the stresses induced in the structures.

In particular, to achieve the neutron characteristics for GFR cores, the fuel volumic fractions in the composite core of the plate element should be greater than 50%, the balance consisting of an inert matrix. Because the power density in the composite core can achieve some hundreds of $MW/m^3$, the heat transfer to the heat exchanger induces high temperature differences between the sheath (surfaces for exchange by the plate element with the heat exchanger) and the composite core of the plate; operation at high temperature (temperature of the heat exchanger over 850° C.) also mandates for the sheathing and the plate element materials having compatible properties of thermal conductivity, transparency to neutrons and mechanical strength, in particular metals and refractory alloys or ceramics.

Second, the high rates of combustion achieved will cause significant expansion of the fuel (several %) and a significant release of gaseous fission products, exacerbated the more by the temperature of the fuel. Each elementary cell of the fuel plate must, if possible, be capable of accommodating these stresses without fracture and without excessive distortion of the plate, which could influence the cross-section for passing the heat transfer between the plate elements: the expansion volume provided in each cell between the fuel and the matrix should be guaranteed in order to avoid a strong mechanical interaction generating unacceptable stress levels for the matrix/sheath structure and to maintain a level of the internal pressure of the fission gases compatible with the mechanical strength of the sheath in all operating situations for the fuel element (normal, in the event of incidents, or even an accident).

This problem is particularly difficult to solve as the operating temperature level implies for structures of the element in plate form the use of materials with low ductility and strength, which makes them particularly sensitive to imposed loads of the distortion type, such as thermal expansion gradients and inflation inside the materials, as well as interactions between fuel and structures (differential inflation and thermal expansion).

No existing structure is ideal for meeting these criteria.

In particular, the document U.S. Pat. No. 3,097,152 proposes a cell geometry including fuel particles which is incapable of covering the range of operating temperatures intended in the GFR: the structural materials of the plate are not compatible with the intended temperatures, in particular where the matrix and the fuel are in contact, with a high density of fuel in the matrix and a high power density. Moreover, the absence of free space around the fuel particles makes it impossible to accommodate at the same time storage at a pressure acceptable by the structure of the fission gases released by the fuel and the differential fuel/matrix distortions thus combined in the thickness of the plate.

The plate design described in the document U.S. Pat. No. 3,070,527 is no longer suited to GFR operating conditions: the plate in this case consists of a compartmented central core, each of the compartments accommodating a metallic or ceramic fuel, the plated sheathings either side providing obturation. As the intended target is water reactors, the fuel is defined to be colder, with thin plates of metallic structures (aluminium, stainless steel, zirconium, zirconium alloys) of the same grade and unconnected to the fuel.

The document U.S. Pat. No. 3,855,061 itself describes a plate design based on the principle of an ordered network of spherical fuel particles, where the scope relates to boiling water reactors (BWR) and pressurised water reactors (PWR or REP): control of the dispersion and of the volumic fraction of the fuel in the composite and its capacity to achieve higher combustion rates are sought. The fuel spheres are therefore arranged in metal plates pierced with circular cylindrical holes (the thickness of each of the plates and the diameter of the holes are equal to the diameter of the spheres), which releases around each sphere an expansion volume accommodating the fission gases and allowing a certain geometric expansion of the fuel. Two metal sheathing plates on either side secure the element against leaks. The filling densities in fuel material of the central matrix of plates can approach 20 to 25%; its ability to achieve large volumic fractions with high power densities and operating temperatures is not discussed.

DESCRIPTION OF THE INVENTION

The development of a new fourth generation of nuclear reactors must therefore more preferably be accompanied by the design of new fuel elements which offset the disadvantages of existing structures.

The invention thus proposes a configuration for the nuclear fuel capable of operating with GFR reactors although not limited to this use.

More generally, the invention relates to a fuel element comprising a sheathing plate provided with a network of walls forming cells, more preferably in the form of a honeycomb, advantageously integral with the plate, and at least one localised pellet of nuclear fuel, with a radial gap, in a cell. Each fuel pellet of the element extends along an axis between two opposing sides, for example in the form of a revolving cylinder; advantageously, at least one of the opposing faces is curved, more preferably in its centre, in other words it has an outward-facing projection such that an initial axial space is also left between the pellet and the cell.

For its use, the element according to the invention comprises a second sheathing plate, provided with the same network of walls as the first or plane, which can be matched to the first plate such that the cells are closed. Advantageously, brazing, bonding or welding can obtain sealed cells, each of which are more preferably filled with an inert gas, such as helium and a fuel pellet.

The plates and walls of the cells according to the invention can be produced in refractory metal or in ceramic, monolithic or reinforced by fibres, such as a silicon carbide with fibres of the same nature or of a different nature. In the case of ceramic plates in particular, a metallic layer can be interposed in the cells, between the pellet and the walls, to perfect confinement of the fission products.

The dimensions of the plates and pellets are matched and optimised according to the reactor. More preferably, the fissile phase represented by the pellets makes up more than 20% by volume of the reactive environment (core), i.e. more than 50% of the volume of the composite core of the plate element, and the free volume between pellets and internal wall represents more than 40% of the volume of the pellets.

BRIEF DESCRIPTION OF THE DRAWINGS

The characteristics and advantages of the invention will be better understood on reading the description which will follow and by referring to the appended drawings, given for illustration but in no way limiting.

DETAILED DESCRIPTION OF PARTICULAR EMBODIMENTS

Figure 1:
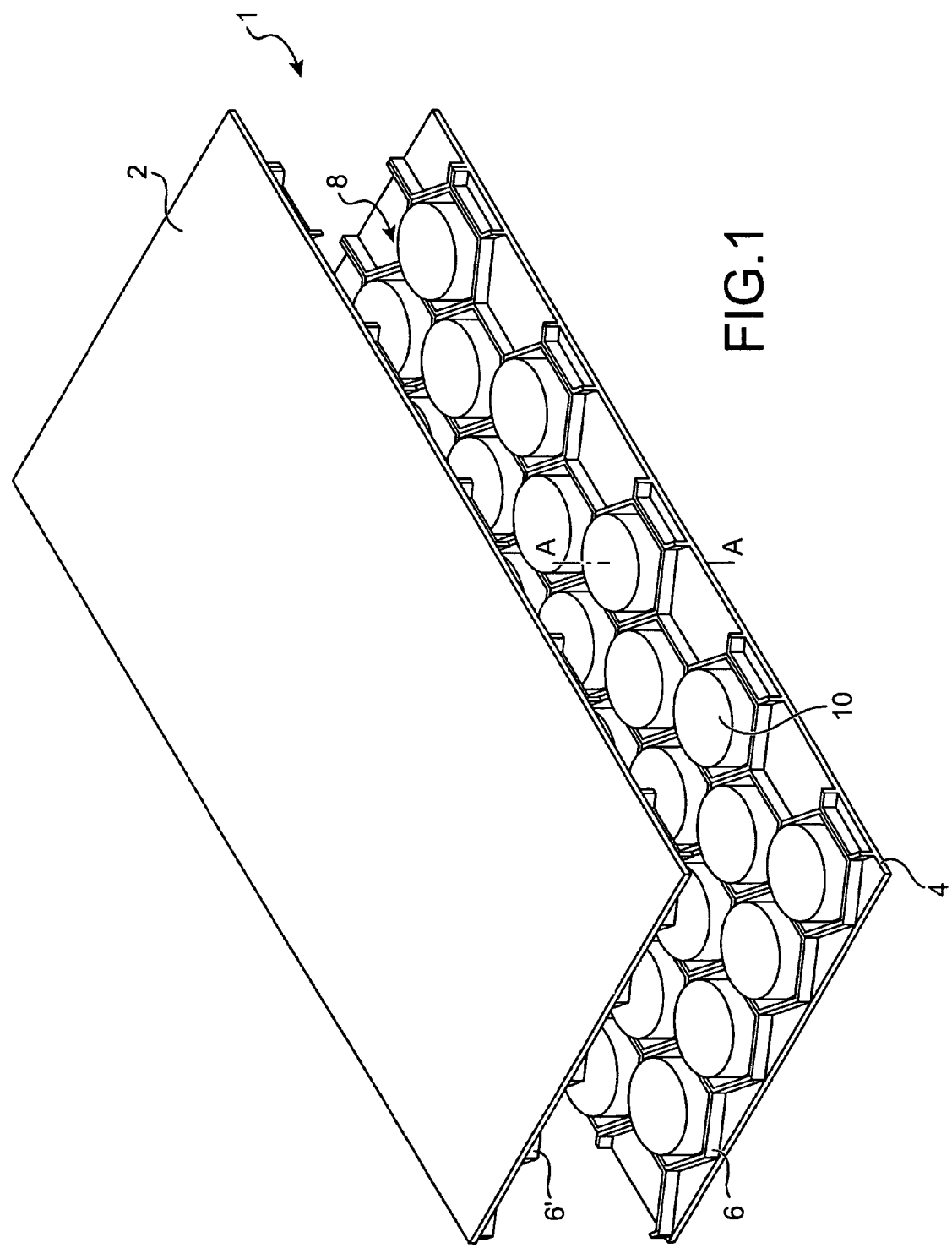
FIG. 1 illustrates one embodiment of an element according to the invention.

In order to best understand the innovative character of the proposed element, a prior analysis of the phenomena occurring in reactors of the GFR type for which the fuel element according to this invention was primarily designed, even if there are other possible applications, will allow the stresses to be considered to be deduced.

Nuclear reactors which work with a fast flow need fuel elements providing a high volumic fraction of fissile materials in the core. Working with the fuel at high temperature also mandates having in the fuel elements an expansion volume capable of collecting the fission gases released. Given the space necessary for passage of the heat exchanger fluid to limit load losses to reasonable values and the volume which other core structures occupy, the part of the volume remaining for the structures and expansion volumes of the fuel elements is small. For the invention, this accordingly involves reducing to the maximum the structural volume (sheath and matrix) in the fuel element to obtain sufficient quantities of fuel together with an expansion volume between the fuel and the confinement cell which contains it.

In particular, so that GFRs achieve satisfactory neutronic operating conditions, the volumic fractions of the fuel material in the reactive environment (core) approximate to at least 20-25% according to the density and enrichment in fissile material of the fuel. The volumic power densities in the core are of the order of 100 MW/m$^3$, and the volumic fraction occupied by the heat exchanger gas necessary for cooling with an acceptable load loss and a heat exchanger temperature meeting the target of T>850° C. should approximate to at least 40%. The volumic powers in the fissile material achieve on average values of 400 to 500 MW/m$^3$, i.e. maximum values of 600-750 MW/m$^3$ according to the flow profiles in the core. Because the other materials making up the composition of the structures occupy the remaining volumic fraction of 30 to 35% (excluding any gap) must have a neutronic transparency in order not to degrade the flow (in intensity and in spectrum).

Finally, to reduce the risk of pollution of the primary circuit of the heat exchanger in case of fracture, the quantity of fission products likely to be released is reduced by a composite geometry of the fuel elements.

Accordingly, the design principles for the new fuel element in the form of plate for GFRs are:

- dispersion of the fuel in elementary cells, each providing with a good degree of reliability (sealing and safety margin before fracture), confinement of the gaseous fission products released at the working temperature of the fuel, which involves strength under pressure of the cells and accommodation of the differential inflation and thermal expansion between the fuel and the structure of the cell, without excessive distortion of the cell,
- arrangement of the elementary cells to correspond to the volumic fraction of fissile product in the core,
- a uniform cooling of the cells by the heat transfer to reduce the range of variation of the operating temperature of the fuel from one cell to another and during irradiation,
- the use of materials compatible with the working temperature level, transparency and non-slowing down of the neutrons, and with the heat flows to be evacuated,
- a slendering ratio (ratio of the thickness or diameter to the largest dimension of the element) compatible with an overall good mechanical strength of the element, guaranteeing its maintenance in position as a structure in the architecture of the core (strength in vibration and non-dislocation of the fuel),
- a form of element accommodating the distortions imposed by the gradients of the operating conditions (temperature, neutronic flow) to which it is subjected, with an induced level of stresses compatible with its mechanical strength.

It was found that a suitable structure comprised a composite element in the form of a plate with a macrostructure defining individual cells for each pellet, illustrated in a preferred form in FIG. 1. The macro-structured composite plate element 1 is constructed on the basis of a sandwich panel with two sheathing plates 2, 4 in which the core is a network 6 of cells 8 ordered as a honeycomb, placed approximately orthogonally to the faces of the plates 2, 4.

The honeycomb structure 6 is the network which gives both:

- the greatest compactness of cells 8 in the plane and thus the greatest free volume to place the fuel 10 in the network 6,
- a good isotropy of the mechanical behaviour of the element 1 in its plane,
- a good rigidity of the element 1 in bending, and
- a high resistance to buckling in compression in its plane.

However, it is possible to adopt, according to the circumstances, other networks of cells, regular (for example a square ram) or not (for example a mixed structure of octagons and squares).

Similarly, it is preferable that the walls which form the network 6 should be of identical thickness for each cell 8, and that they should be perpendicular to the plane of the structure 1; however, variations can be considered, particularly for construction reasons.

Each cell 8, delimited by the walls 6 and closed at its ends by the sides 2, 4 of the plate element 1, constitutes an elementary cell built according to the design principles set out earlier to provide heat transfer between the fuel 10 which will be located in it and the sides of the sheathing plates 2, 4 cooled by the heat exchanger, in order to look after the expansion volume for the fission gases, and to foster a mechanical interaction between the fuel 10 and the sheath 2, 4 with low stress levels in the structures of the cell.

Each hexagonal section cell 8 can accommodate and advantageously accommodates a fuel pellet 10 of cylindrical and circular form having (see FIG. 2):

- a calibrated axial gap 12 between pellet 10 and sheath 2, 4 (for example some tens of µm) to regulate the temperature at the core of the fuel throughout the period of use of the element 1, the objective being to ensure the transfer of all the power from the pellet 10 through this gap,
- a radial gap 14 between pellet 10 and walls 6 of the cell 8, dimensioned to create the expansion volume necessary in the cell and to prevent circumferential mechanical interaction between the pellet 10 and the cell 8.

The expansion volume de facto consists of the circumferential gap 14 and the difference in volume released between the internal hexagonal shape of the cell 8 and the circular cylinder 10 inscribed in the hexagon. The radial gap 14 is more preferably large (for example some hundreds of µm) to provide thermal decoupling between the pellet 10 and the wall 6 of the cell 8. Radial heat exchanges via the walls of the cell are in this way avoided, or at least minimised, in order to maintain the network 6 at an average temperature equal to that of the sheaths 2, 4 and thus avoid differential expansions between the sheaths 2, 4 and the central structure 6 of the composite.

It is also possible to create a controlled mechanical interaction between the pellet 10 and the sheath 2, 4 in an axial direction, by regulating the initial gap and by using in particular the pellets 10 with a curved end profile which establishes a gradual contact of the centre of the cell 8 towards the periphery (any other protuberance would be feasible, but the curved geometry, besides its simplicity in manufacture, can obtain a symmetry and a gradual contact which distributes the force over a large area). The bending distortion imposed on the sheaths 2, 4 by the pellet is then accommodated, on one hand, by the pellet 10 itself (which is distorted radially: see below), and on the other hand in bending by the sheath, the rigidity of which is matched (thickness of the sheath 2, 4 and dimensions of the cells 8) to minimise the stresses induced in the structures of the cell 8.

The accommodation by the fuel 10, itself prevented from some distortions axially owing to the mechanical contact is achieved more preferably by circumferential expansion in the radial gap 14. The distortions of the fuel pellet 10 thus occur in a system where one direction is stressed (direction in the axis AA of the pellet 10), and the other two are free (circumferential expansion). In this system, the fuel pellet 10 has a minimum rigidity in its direction AA of interaction with the sheath 2, 4.

Accordingly, as illustrated in FIG. 2, the honeycomb network 6 has in a particularly preferred manner hexagonal cells 8 each with a fuel pellet 10 of circular cross-section. A free volume 14 is arranged between the pellet 10 and the walls 6, which guarantees an absence of radial interaction between pellet 10 and cell 8; the sheaths 2, 4 close the ends of the cell 8, with an axial gap 12 providing heat transfer between the pellet 10 and the sheath 2, 4. Each face opposite the fuel pellet 10 along its axis AA has a convexity 16 to localise the gradual contact between pellet 10 and sheath 2, 4 at the centre of the cell 8.

More preferably, the entire structure of the element 1, i.e. the network 6 and each of the sheathing plates 2, 4, is manufactures in the same refractory material, which can be a metal, or a ceramic, the ceramic possibly being monolithic or incorporating fibres that are themselves ceramic.

Figure 2A:
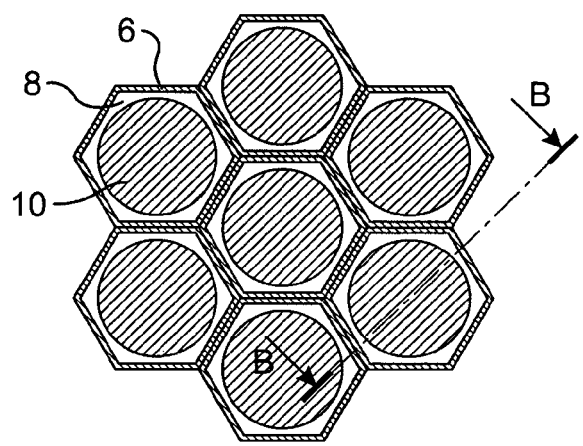
FIGS. 2A and 2B, and 2C and 2D respectively, show embodiments of elements according to the invention in diagram form.
Figure 2B:
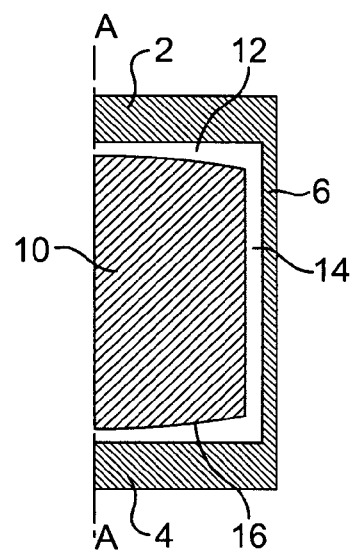
Figure 2C:
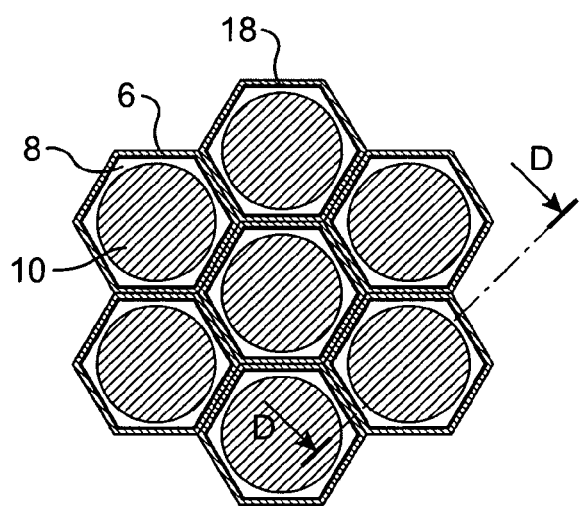
Figure 2D:
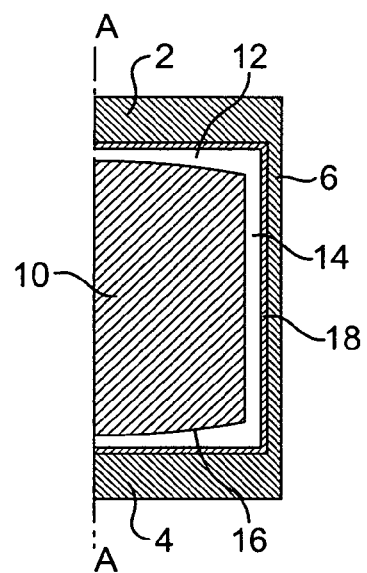

In particular, if the walls are ceramic, as illustrated in FIG. 2C, it is possible to add a metallic layer 18, or "sheet", plated on the walls of each cell 8. More preferably, the sheet 18 encapsulates the pellet 10 and its expansion volume 12, 14, to increase in this way confinement of the products generated while the reactor is in operation.

As regards the assembly, as is clear in FIG. 1, the plate element 1 can consist of two half-elements assembled in the mid-thickness plane, in other words midway up the walls 6. The two half-elements 2, 6' and 4, 6 can actually be identical and each incorporate on one side of the sheathing plate 2, 4 the network 6, 6' of hexagonal cells as an "impression". In another embodiment, this can be the assembly of a plate 4 incorporating in impression on one side of the complete network 6 of cells 8 with a smooth sheathing plate closing the cells 8 on the other plane. It is also possible to produce the central grid 6 as a honeycomb structure independently, then to assemble it with two plane plates 2, 4 manufactured separately.

If the structures of the fuel element 1 (sheaths 2, 4 and grid 6) allow the choice of a metallic material, the three preceding embodiments are feasible: the positioning of the linking planes between the structures 2, 4, 6 is determined by ease of production considerations. However, in the case of an embodiment of an "all ceramic" element, it can be preferable to use only one linking plane between two sub-structures, and to site it at the median plane of the element 1 (as illustrated in FIG. 1), i.e. where the stresses in operation are least; this option broadens the choice of the ceramic-ceramic bonding methods to be used (brazing, welding by diffusion, bonding by a ceramic precursor, etc.).

According to one particularly advantageous embodiment for satisfying the fast flow operating conditions, high heat exchanger temperature and high power density in a GFR, the fuel pellets 10 are cylindrical and circular of a diameter of 11.18 mm and a height of 4.9 mm, comprising a curved form 16 at the ends (arrow at the centre 30 μm at least); these pellets are manufactured from (U, Pu)C according to a standard method with a porosity rate of 15%.

It must be understood that the numerical values given are purely for information and must in any event be interpreted with the usual margins for error.

The fuel element 1 is then designed with a sheath 2, 4, 6 made from monolithic ceramic (SiC for example) or a fibrous composite (SiC—SiCf for example), with a total thickness of 7 mm. It is produced by assembling two identical half-elements, each incorporating flat base 2, 4 of a thickness of 1 mm and a network 6, 6' of a height of 2.5 mm defining a honeycomb grid with cells 8 at intervals of 14 mm, and walls with a uniform thickness of 1.3 mm. The assembly of the two half-elements is effected by brazing (with the method adapted to the ceramic and to the temperature range), by welding by diffusion or by bonding.

The cells are filled with helium gas at atmospheric pressure. The axial gap 12 between pellet 10 and sheath 2, 4 is 100 μm, the radial gap 14 (between the flats of the hexagon) is 760 μm: the initial free volume between the pellet 10 and the sheath 2, 4, 6 (not counting the volume of the porosities of the fuel) then accounts for 47% of the volume of the fuel pellet.

In the case of installing a metallic sheet 18, its thickness between 25 and 100 μm inclusive, is included in the thickness of the walls 6 of the cells 8 and the sheaths 2, 4: for example, the thickness of the walls is adjusted from 1.3 mm to 1.1 mm for a sheet thickness of 100 μm. The sheet can consist of semi-refractory metal alloys, for example based on tungsten, molybdenum, niobium, etc.

Furthermore, titanium or zirconium carbides can replace silicon carbide; ternary carbides can also be considered, or titanium or zirconium nitride, in particular for a nitrided fuel, for example UPuN.

In this configuration, the volumic fraction of the fuel in the composite central core of the plate is 56%.

The plates 2, 4 are rectangular and with dimensions approximately 120×250 mm. The arrangement of these elements 1 in the core of the reactor provides the volumic fraction of 22.4% for the fissile phase in the reactive environment necessary for operation of the GFR core.

The behaviour of this element 1 was analysed in the operating conditions of a 2400 MW GFR with a uniform volumic power density in the core of 100 MW/m$^3$, a temperature in the output of the heat exchanger of 850° C. and a fuel combustion rate of at least 10% atomic. The thermomechanical behaviour of an elementary cell was analysed with the CAST3M finite elements software in all operating situations allowing dimensioning: normal operation and shutdown situation (return to an isothermic cold state without pressure in the heat exchanger), incidents with fast load variation (increase in power of 10%), and accidental situations with slow or fast depressurisation of the heat exchanger gas.

This study was conducted:

1) on the cell having the maximum power density value in the core (in the plane of maximum flow at the centre of the core), i.e. a value of 670 MW/m$^3$ and an external temperature of the faces of the plate of 872° C., 2) for cells having different operating conditions along an axial profile at the centre of the core (conditions varying from the input to the output of the core while passing through the plane of maximum flow).

The results showed that, for normal operation up to 10% atomic, while assuming a rate of release for the fission gases of 10% of then fuel (U—Pu)C:

i. The internal pressure at the end of life in the most loaded cell 8 (6.2 MPa) just approaches the value of the external pressure of the heat exchanger (7 MPa). The unit 1 of cells 8 thus operates throughout its life with an internal pressure less than the external pressure, which favours a quasi-contact between plate and pellet (the beneficial effects of which are discussed below).

ii. The axial gap 12 during the life is corrected with an interaction between pellet 10 and sheaths 2, 4 which induces:
   a regulation of the temperature of the fuel 1 during irradiation (if the volumic power is supposed constant, the maximum temperature of the fuel varies over a range of 50° C. and remains below 1300° C.); the gradual closure of the axial gap 12 compensates for the loss of conductivity of the gas as the fission gases are released, a diametral expansion of the fuel 10 (by anisotropy of the inflation and by creeping) with a level of axial distortion of the cell 8 which remains very low (maximum distortion in the cell environment of the thickness of the plate of 44 μm), a low level of stress induced in the structures, whatever the bending stress in the sheaths 2, 4 or the tensile stress in the bonding plane 6, 6' which remains below 10 MPa.

iii. There is no correction of the radial gap 14, the residual gap at the end of life and the gradual degradation of its conductivity by the fission gases capable of isolating thermally the partitions 6 of the cells 8 of the fuel pellet 10. The average temperature of these walls 6 being the same as that of the sheaths 2, 4, there are accordingly no differential distortions between the honeycomb 6 and the two plates 2, 4 (by expansion and inflation).

The simulation of a rapid increase of the volumic power by 10%, although the pellet 10 is interacting with the sheaths 2, 4 shows that the low bending rigidity of the sheaths can accommodate without significant additional stresses the instantaneous distortion imposed on the cell 8 by the pellet 10.

Similarly, the loss of external pressure, in the shutdown situation in question and in depressurisation accidents, which puts the cells 8 of the elements 1 into internal overpressure, causes an acceptable stressing of the structures 2, 4, 6 of the cell: moderate bending of the sheaths and putting under tension the bonding plane with a maximum value of 24 MPa in the event of rapid depressurisation.

This study reveals that a significant part of the stresses in the structures 2, 4, 6 of the cells 8 in operation is induced by the distortion loads imposed, by thermal expansion and inflation, locally in the thicknesses, longitudinally or between sub-structures. These stresses can be relaxed during irradiation by creeping (irradiation creeping and thermal creeping). Their level depends also directly on the physical and mechanical properties of the materials used.

The modulus $$M = \frac{E \times \alpha}{\lambda \times (1 - \nu)}$$

where E is Young's modulus, α the coefficient of thermal expansion, λ the thermal conductivity and ν Poisson's ratio, is used to choose the material which minimises these loads by a low value of M. For example, the table below gives values of M at 1000° C. for a metallic sheath in Nb-1Zr—C and the composite ceramic SiC—SiCf.

| Properties at 1000° C. | Nb—1Zr—C | SiC—SiCf |
|---|---|---|
| E (GPa) | 84 | 192 |
| α ($10^{-6}$/K) | 7.185 | 4 |
| λ (W/m · K) | 61.16 | 10 |
| ν | 0.4 | 0.18 |
| M | 16.645 | 93.66 |

The fuel element according to the invention, while meeting the specification imposed by GFRs, shows in this way its ability to cover a range of operating conditions and performances broader than existing elements, for any network:

option to access filling densities of the fuel 10 greater than 50% in the composite 1 (U.S. Pat. No. 3,855,061 allowed only 25%) as a result of the geometry of the composite plate, capacity to provide confinement of the fission gases (as well as the current elements of current RNR and HTR spheres) and to accommodate the interaction between pellet 10 and sheath 2, 4, 6 without breaking owing to blocking, with a low rigidity, to a single direction AA of distortion (better than the RNR elements blocking 2 directions of distortion of the fuel, and than HTR spheres blocking the three), capacity to provide thermal exchange to the heat exchanger by regulating the maximum temperature at the core of the fuel, capacity to operate in a high performance manner (high temperature, rate of combustion and power density) with structural materials ceramic—(monolithic or fibrous composite) or metallic refractory-types while accommodating the distortion loads imposed with a low stress level.

This type of plate element can be adapted for applications in other networks (experimental reactors, thermal reactors, fast reactors and high temperature thermal reactors in particular). The sheath/fuel material pairs commonly employed in these applications can actually be transposed directly to the design of macro-structured plate elements according to the invention: as the honeycomb structure functions under the same conditions of thermal, chemical and mechanical stresses as the usual sheaths, the same material is therefore implicitly qualified.

The composite plate fuel elements designed according to the invention can therefore:

have heavy core density compatible with obtaining fast flows, the hexagonal mesh honeycomb structure allowing volumic fractions in fuel filling of over 50%, be used to refill the cells fuel pellets such as $UO_2$, $UO_2$—$PuO_2$, UC, (U,Pu)C, UN, (U,Pu)N, etc., produced using standard methods, limit the internal pressure of the fission gases released by the fuel in the cells by means of the expansion volume defined by the gaps between the pellet and the matrix, this expansion volume accounting for approximately 0.5 times the volume of the fuel pellet, which allows high-performance nuclear combustions ("burnups"), reduce the inventory of fission products capable of being salted out in the heat exchanger in case of leaks in the cell, each cell closed at its ends by the sheaths constituting a sealed cell;

accommodate differential distortions (thermal expansion and inflation) between the fuel and the structures of the cell with very low distortions of the plate element not prejudicing the distribution of the cooling flows between elements, optimise the size of the cells (no hexagonal network) with centimetric size cells and millimetric wall and sheath thicknesses to:

provide thermal transfer to the heat exchanger, more preferably via the ends of the pellets, obtain uniformity of the average temperatures in the materials of the structure, adjust the bending rigidity of the sheaths which close the cells, minimise the stresses induced in the cell structures (at this level, the choice of materials in order to minimise loads of the distortion type imposed, by thermal expansion and inflation also plays a part with, as the criterion of choice, the search for the smallest modulus $$M = \frac{E \times \alpha}{\lambda \times (1-\nu)}$$

to optimise the behaviour of the cell), regulate the maximum temperature of the fuel throughout its life by managing the gradual contacts between pellet and sheath providing heat transfer, operate in all types of fast or thermal reactors with levels of power density in the fuel which can reach some hundreds of MW/m$^3$ with structural materials (metallic) for the plate matched to the operating temperatures, to the nature of the heat transfer and to the fuel, operate in fast high temperature or thermal reactors with an element produced completely in monolithic or fibre-reinforced ceramic, add a refractory metallic component, in the form of a thin sheet or a deposit to guarantee the sealing in the case of a fuel for high temperature reactors, thus warning of insufficient quality in the confinement of the ceramic.

The invention claimed is:

1. Nuclear fuel element comprising a first plate, a first network having a plurality of walls integral with the first plate for forming a plurality of individual cells separated from one another and defined by said walls, and at least one nuclear fuel pellet having opposite sides confined within a corresponding cell such that a circumferential gap is formed between said opposite sides of said pellet and the walls of the cell, with the nuclear fuel pellet extending along an axis aligned in a direction approximately parallel to the walls of the cell; a second plate disposed in parallel alignment with said first plate on a side of said network opposite to the first plate in order to close the cells; said second plate is integral with a second network, substantially the same as the first network; and an axial gap formed between the at least one fuel pellet and the first and second plates.

2. Element according to claim 1, wherein the walls of the networks have the same thickness, taken in a direction parallel to the first and second plates.

3. Element according to claim 1, wherein the first and second networks are manufactured in a unitary manner with the first and second plates, respectively.

4. Element according to claim 1, wherein each closed cell is filled with helium.

5. Element according to claim 4, wherein the fissile phase of the fuel pellets accounts for more than 20% of the volume of the element.

6. Element according to claim 1, wherein the gaps formed in the cell create a residual volume in such cell, which accounts for at least 40% of the volume of the pellet located in such cell.

7. Element according to claim 1, wherein at least one of the opposite sides of the pellet is curved outwards to minimize comparative stress levels in the plate facing said opposite side of the pellet.

8. Element according to claim 1, wherein the first and second networks are a honeycomb structure of hexagonal cells.

9. Element according to claim 1, wherein the plates and the networks are made from the same refractory material, metal or ceramic.

10. Element according to claim 9, wherein the plates and the networks are composed of a ceramic.

11. Element according to claim 10, wherein said ceramic is SiC.

12. Element according to claim 11, wherein each pellet is cylindrical in geometry.

13. Element according to claim 10, wherein said ceramic is fibrous.

14. Element according to claim 10, further comprising a metallic layer plated on to the walls of each cell.

\* \* \* \* \*